US006533567B2

(12) United States Patent
Suganuma et al.

(10) Patent No.: US 6,533,567 B2
(45) Date of Patent: Mar. 18, 2003

(54) INJECTING APPARATUS WITH CHECK VALVE

(75) Inventors: Masashi Suganuma, Nagano-ken (JP); Kazuki Hayashi, Nagano-ken (JP); Takayoshi Shioiri, Nagano-ken (JP)

(73) Assignee: Nissei Plastic Industrial Co., Nagano-ken (JP)

( * ) Notice: Subject to any disclaimer, the term of this patent is extended or adjusted under 35 U.S.C. 154(b) by 84 days.

(21) Appl. No.: 09/881,405

(22) Filed: Jun. 14, 2001

(65) Prior Publication Data

US 2001/0053392 A1 Dec. 20, 2001

(30) Foreign Application Priority Data

Jun. 16, 2000 (JP) ........................................ 2000-182068

(51) Int. Cl.[7] ............................................... B29C 45/76
(52) U.S. Cl. ....................................... 425/145; 425/559
(58) Field of Search ................................... 425/145, 559

(56) References Cited

U.S. PATENT DOCUMENTS 4,904,178 A * 2/1990 Sonoda et al. ............... 425/559
4,951,920 A * 8/1990 Tsuno ......................... 425/559
4,966,539 A * 10/1990 Pena ........................... 425/559
4,988,281 A * 1/1991 Heathe et al. ................ 425/559
5,167,971 A * 12/1992 Gill et al. .................... 425/559
6,155,816 A * 12/2000 Urbanek et al. ............. 425/559
6,270,703 B1 * 8/2001 Wildman et al. ............ 425/559

* cited by examiner

Primary Examiner—Tim Heitbrink
(74) Attorney, Agent, or Firm—Merchant & Gould P.C.

(57) ABSTRACT

A screw injecting apparatus includes a check valve mounted on the tip end portion of a screw and adapted to be opened and closed in response to rotation of the screw, and a control for controlling operation of the screw such that in a metering phase of molding process, the screw rotates in one direction to feed a melt of molding material toward the nozzle while the check valve is in an open state, when a metered amount of melt is accumulated forward of the tip end portion, the screw moves backward by a predetermined distance to reduce a reaction from the melt accumulated around the tip end portion, thereafter, the screw rotates in the reverse direction to close the check valve and cause the screw to advance until the amount of forward movement of the screw becomes substantially equal to the predetermined distance of backward movement achieved previously.

4 Claims, 8 Drawing Sheets

INJECTING APPARATUS WITH CHECK VALVE

BACKGROUND OF THE INVENTION

1. Filed of the Invention

The present invention relates to an improvement in an injecting apparatus equipped with a check valve for preventing the reverse flow of a melt of molding materials.

2. Description of the Related Art

Figure 7:
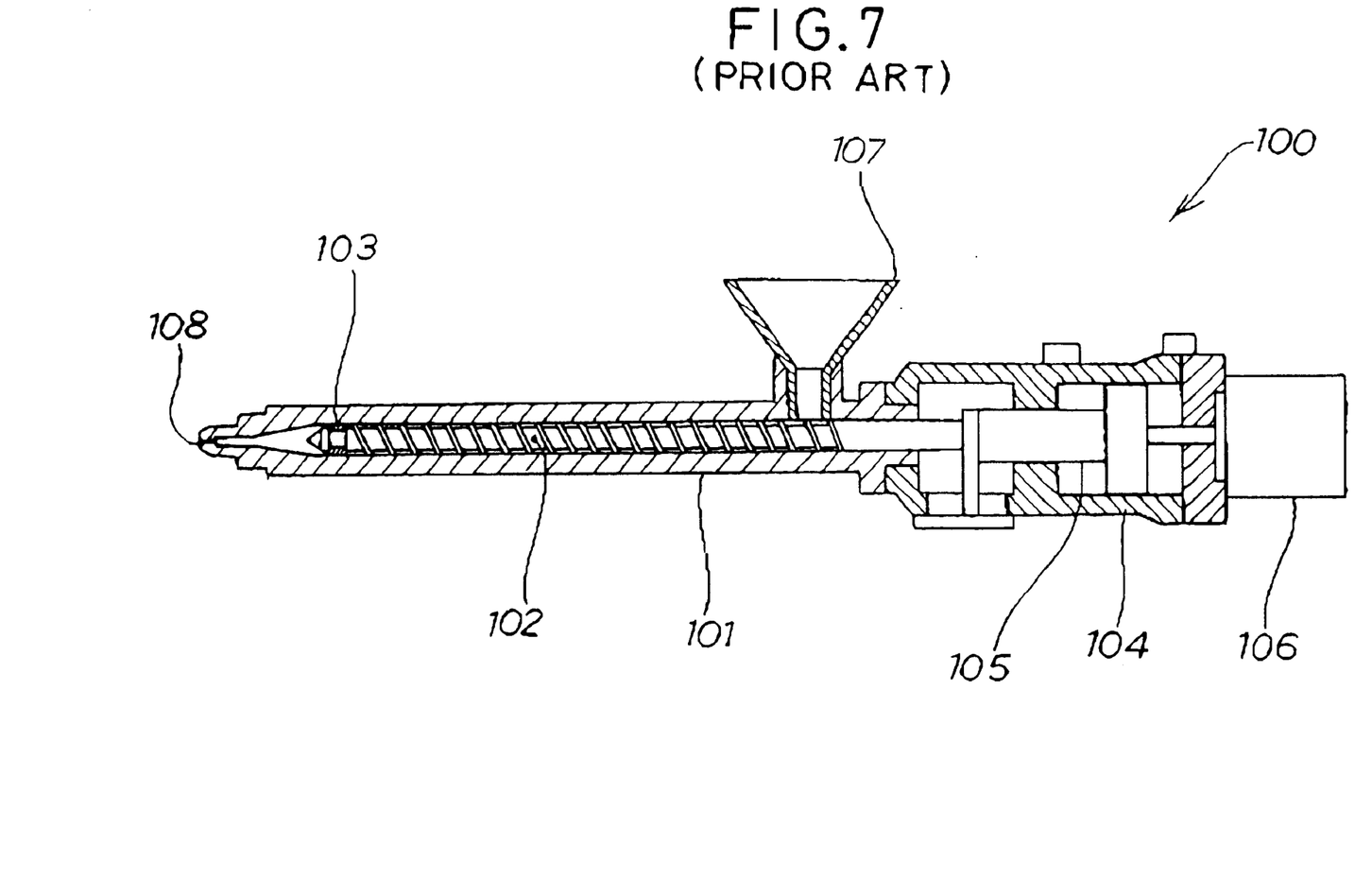
FIG. 7 is a view similar to FIG. 1, but showing a conventional injecting apparatus.

A typical prior screw injecting apparatus is shown in cross section in FIG. 7 hereof. The screw injecting apparatus 100 generally comprises a heating cylinder 101, a screw 102 received in the heating cylinder 101 rotatably and movably back and forth, a check valve 103 mounted on the tip end of the screw 102, an injecting cylinder 104 for moving the screw 102 back and forth, and a rotating means or device 106 for rotating the screw 102 via a piston rod 105 of the injecting cylinder 104.

In the injecting apparatus 100 thus arranged, plasticizing-metering phase, waiting phase and injecting phase are carried out in a manner as described below.

Plasticizing-metering phase: Raw molding materials are fed from a hopper 107 into the heating cylinder 101 during rotation of the screw 102 and heated by the heating cylinder 101 while being transferred toward a discharge nozzle 108 by rotation of the screw 102. By friction heat arising from the transfer and heat transmitted from the heating cylinder 101, the molding materials are plasticized and kneaded.

During that time, the check valve 103 is in the open state and thus permits passage therethrough of a melt of molding materials.

The screw 102 is pushed back rightward in FIG. 7 by a counter force of the melt accumulated around the tip end of the screw 102 (between the check valve 103 and the nozzle 108). The amount of melt can be metered by measuring the retreating or backward stroke of the screw 102.

Waiting phase: After completion of the metering, the screw 102 is held inactive until the melt becomes ripe for injection.

Injecting phase: By activating the injecting cylinder 104, the screw 102 is rapidly advanced at one stroke to cause a metered amount of melt accumulated forward of the screw 102 to be injected through the nozzle 108 into a mold not shown. Advancing movement of the screw 102 causes the check valve 103 to close, so that the melt is prevented from flowing back toward the screw 102.

Figure 8A:
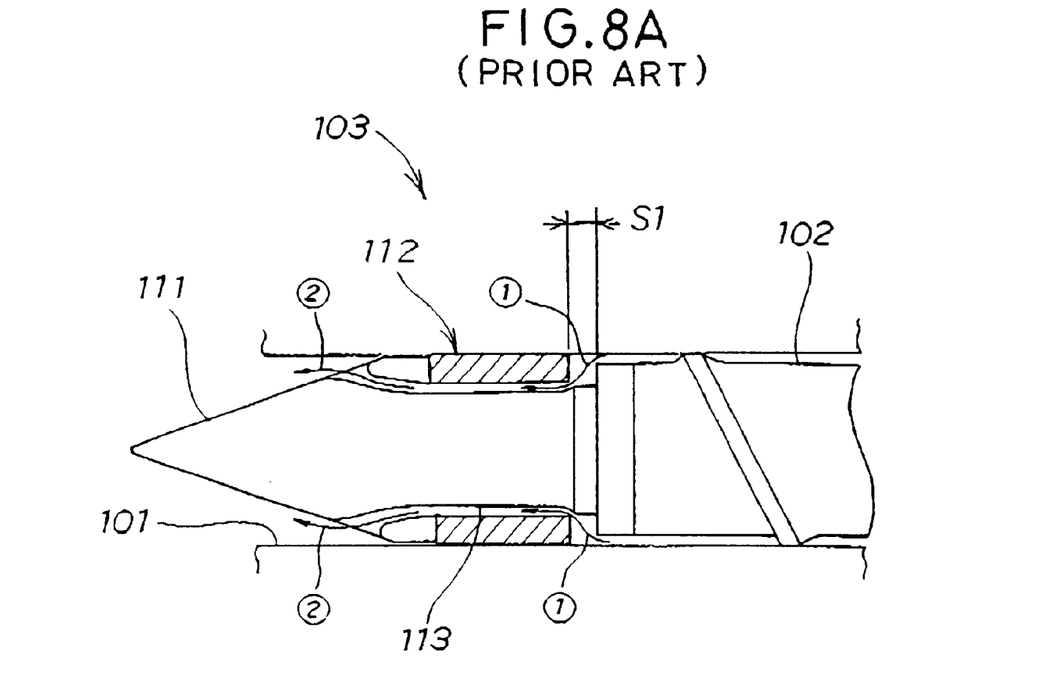
FIGS. 8A and 8B are cross-sectional views showing the structure and operation of a check valve incorporated in the conventional injecting apparatus.
Figure 8B:
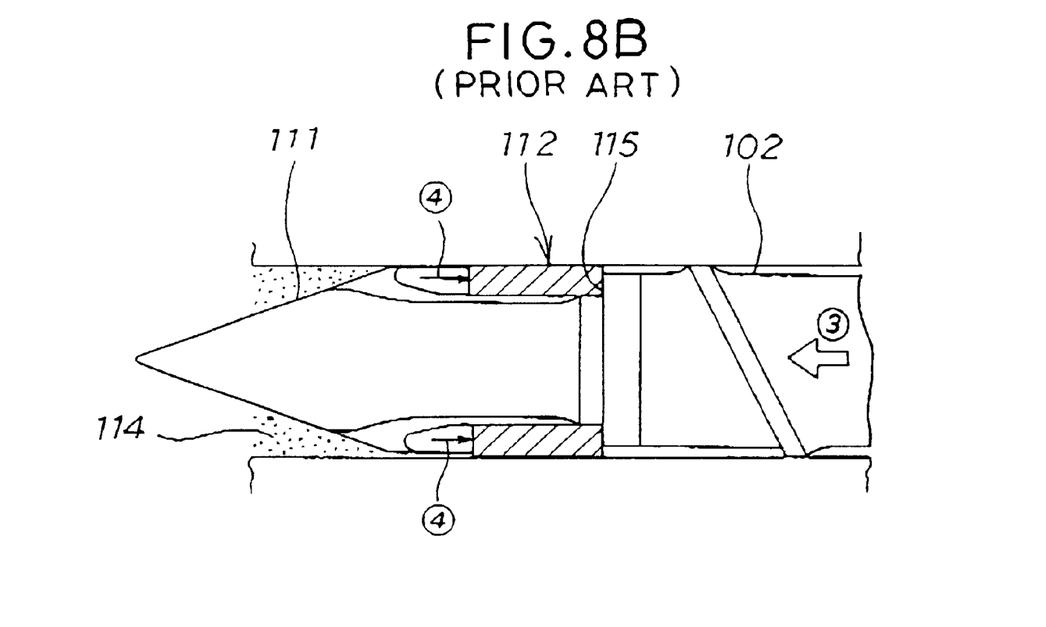

FIGS. 8A and 8B are views illustrative of the structure and operation of the check valve 103 of the conventional screw injecting apparatus 100.

As shown in FIG. 8A, the check valve 103 is provided on the tip end of the screw 102 and includes a screw head 111 attached to the tip end of the screw 102 and a cylindrical check ring 112 slidably mounted on the screw head 111.

In the metering phase, the check valve 103 is in the open state so that rotation of the screw 102 causes a melt of molding materials to pass through a passage 113 in the check valve 103 in the direction of the arrows ① and ② shown in FIG. 8A.

In the injecting phase, as shown in FIG. 8B, the screw 102 is rapidly advanced as indicated by the profiled arrow ③. As the screw 102 advances, the check ring 112 is subjected to a force or pressure applied from a metered amount of melt 11 accumulated forward of the screw head 111. This causes a backward movement of the check ring 112 as indicated by the arrow ④, which continues until the check ring 112 comes into abutment with a valve seat 115 formed on a shoulder of the screw 102 (S1 shown in FIG. 8A is zero). The check valve 103 is thus closed so that the reverse flow of the melt 114 toward the screw 102 does not take place.

However, from the start of backward movement of the check ring 112 to the arrival of the check ring 112 at the valve closing position shown in FIG. 8B, the passage 113 is still in an open state. Accordingly, the melt 114 can flow backward through the passage 113 to the screw 102 side. Even though the amount of melt 114 flowing backward is very small, such backflow of the melt 114 deteriorates the metering accuracy.

In order to increase the injecting speed and metering accuracy, the amount of melt 114 flowing backward should be reduced to near zero.

SUMMARY OF THE INVENTION

It is accordingly an object of the present invention to provide an injecting apparatus equipped with a check valve which is capable of reducing the amount of backflow of the melt to nearly zero.

To achieve the foregoing object, according to the present invention, there is provided a screw infecting apparatus comprising: a heating cylinder for heating a molding material being transferred therethrough, the heating cylinder having a nozzle at one end thereof; a screw received in the heating cylinder rotatably and movably back and forth and having a tip end portion spaced backward from the nozzle, the screw, when rotating in one direction, feeding a melt of molding material toward the nozzle while the screw is pushed back by a reaction of the melt accumulated around the tip end portion of the screw head; and a check valve for preventing the melt from flowing backward toward the screw. The check valve comprises a seat ring mounted on the tip end portion of the screw and movable in unison with the screw, the seat ring having an axial groove for the passage therethrough of the melt, and a check ring mounted on the tip end portion of the screw in tandem relation to the seat ring and rotatable relatively to the screw and the seat ring within a predetermined angular range, the check ring having an axial groove for the passage thererthrough of the melt, the axial groove of the check ring and the axial groove of the seat ring being phased such that rotation of the screw in said one direction causes the axial groove in the check to communicate with the axial groove in the seat ring, thereby permitting passage of the melt through the check valve, and rotation of the screw in the reverse direction causes the axial groove of the seat ring to be closed by a body of the check ring, thereby blocking passage of the melt through the check valve. The screw injecting apparatus further includes a control unit for controlling operation of the screw such that in a metering phase of molding process, the screw rotates in said one direction to feed a melt of molding material toward the nozzle, when a metered amount of melt is accumulated forward of the tip end portion of the screw, the screw moves backward by a predetermined distance to reduce the reaction from the metered melt and, thereafter, the screw rotates in the reverse direction to cause the screw to move forward until the amount of forward movement of the screw becomes substantially equal to said predetermined distance.

When the screw is rotating in one direction (normal direction), the check valve is open, so that a melt of molding material is fed toward the nozzle and accumulated forward of the tip end portion of the screw disposed backward of the nozzle. The screw while rotating in the normal direction is pushed back by a reaction of the meld accumulated around the tip end portion of the screw. By measuring the stroke of the screw in the backward direction, it is possible to meter the amount of melt accumulated forward of the tip end portion of the screw.

When the metered amount of melt is accumulated forward of the tip end portion of the screw, the check valve may be closed in preparation for the injecting process by rotating the screw in the reverse direction. In this instance, however, reverse rotation of the screw causes the screw to move forward as if the screw bits into the metered melt accumulated around the tip end portion of the screw. With this forward movement of the screw, the metered melt is forced to leak out from the nozzle.

To avoid this problem, according to the present invention, when the metered amount of melt is accumulated forward of the tip end portion of the screw, the screw is moved backward by a predetermined distance under the control of the control unit. With this backward movement of the screw, the pressure in a melt accumulating chamber defined between the nozzle and the check valve is reduced. Then, the screw is rotated in the reverse direction to move the screw itself to move in the forward direction until the amount of forward movement of the screw becomes substantially equal to the predetermined distance of backward movement of the screw achieved previously. With this forward movement, the screw can assume the position achieved at the end of the metering phase or operation, so that the leakage of the melt from the nozzle does not take place. Additionally, since the check valve is closed in preparation for the injecting process, the amount of reverse flow of the melt does not take place during the injecting process. This enables a high-speed injecting process with improved metering accuracy.

In one preferred form of the present invention, the tip end portion of the screw has a plurality of evenly spaced driving teeth formed on an outer circumferential surface thereof, the check ring has a plurality of evenly spaced driven teeth formed on an end face thereof for meshing engagement with the driving teeth of the tip end portion of the screw. The axial groove of the check is formed in an outer circumferential surface of the check ring, and the axial groove in the seat ring is formed in an inner circumferential surface of the seat ring.

It is preferable that the control unit determines the amount of forward movement of the screw caused by reverse rotation of the screw on the basis of a correlation established between the amount of reverse rotation of the screw and the amount of forward movement of the screw.

The above and other objects, features and advantages of the present invention will become manifest to those versed in the art upon making reference to the following description and accompanying sheets of drawings in which a certain preferred structural embodiment incorporating the principle of the invention is shown by way of illustrative example.

DETAILED DESCRIPTION OF THE PREFERRED EMBODIMENT

The following description is merely exemplary in nature and is in no way intended to limit the invention or its application or use.

Figure 1:
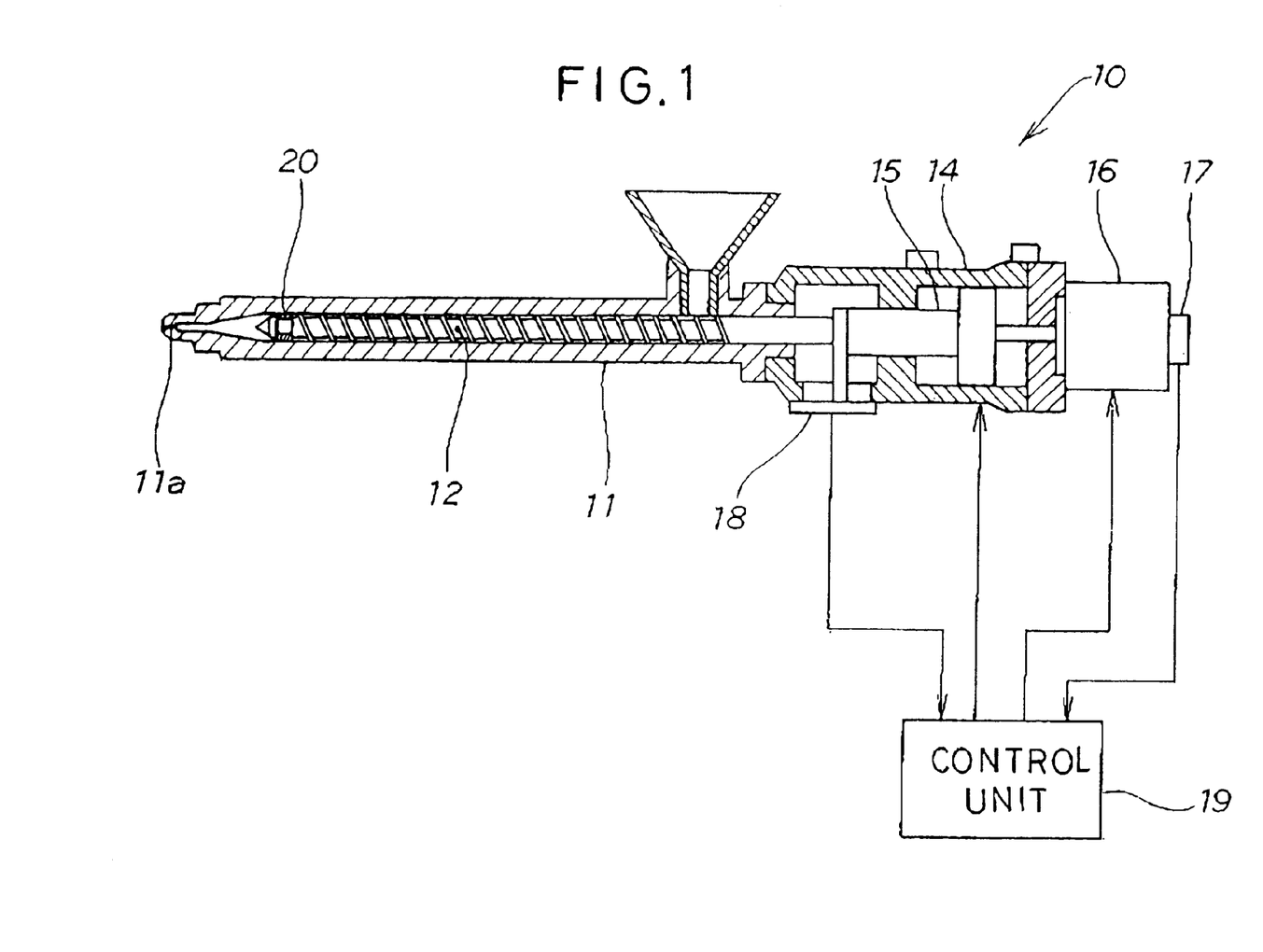
FIG. 1 is a longitudinal cross-sectional view of an injecting apparatus equipped with a check valve according to an embodiment of the present invention.

Referring to the drawings and FIG. 1 in particular, there is shown a screw injecting apparatus equipped with a check valve according to an embodiment of the present invention. The screw injecting apparatus 10 generally comprises a heating cylinder 11 for heating a molding material being transferred therethrough, a screw 12 received in the heating cylinder 11 rotatably and movably back and forth, a check valve 20 mounted on a tip end of the screw 12, an injecting cylinder 14 for moving the screw 12 back and forth, a rotating means or device 16 for rotating the screw 12 via a piston rod 15 of the injecting cylinder 14, and a control unit 19 for controlling operation of the injecting cylinder 14 and rotating device 16 on the basis of output electric signals supplied from sensors 17, 18. The sensor 17 is a rotary sensor which detects the amount of angular displacement of the shaft 12, and the sensor 18 is a linear displacement sensor which detects the stroke or the position of the screw 12 in the backward direction.

Figure 2:
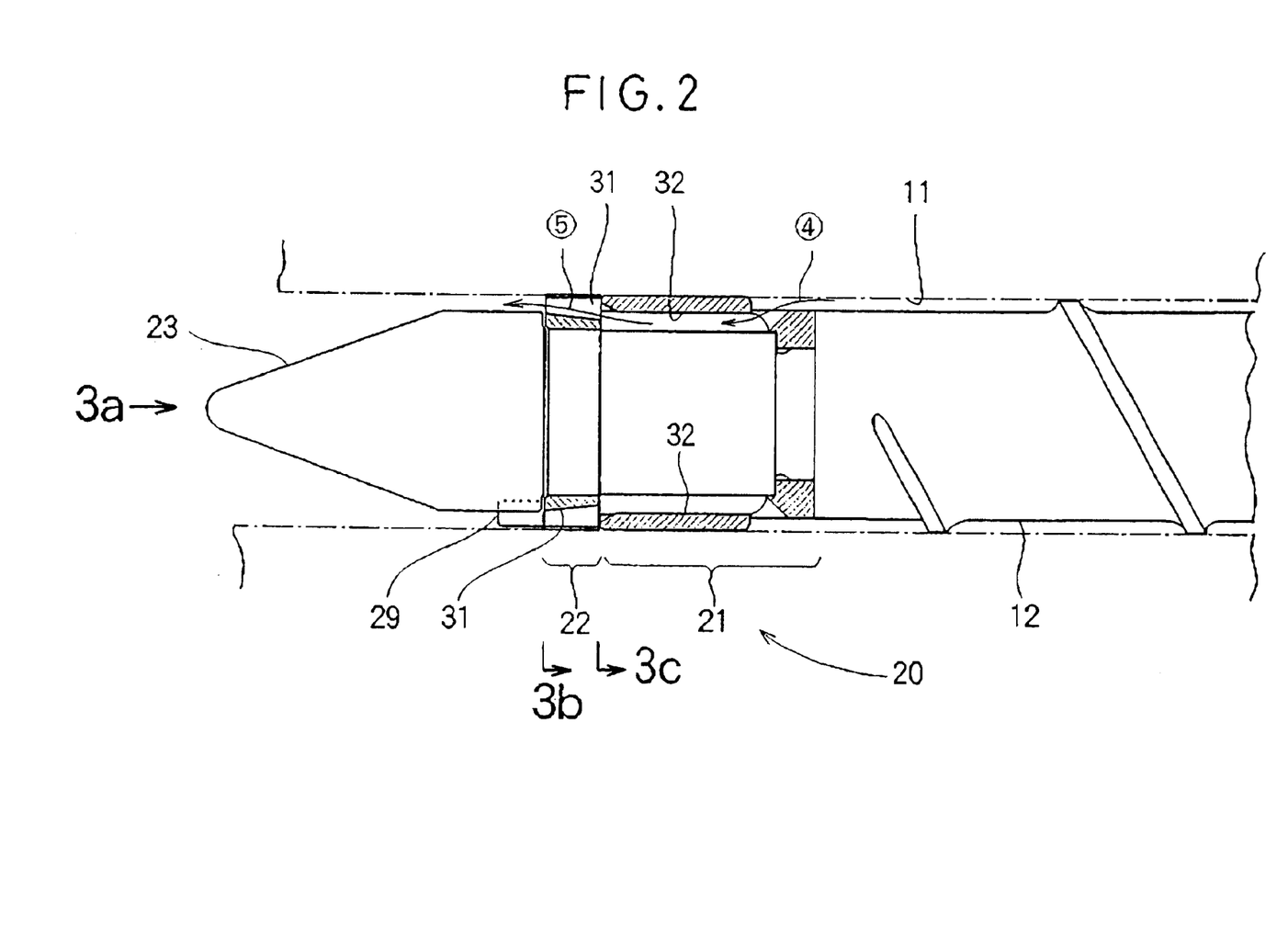
FIG. 2 is an enlarged view of a part of FIG. 1, showing the check valve in its open position.

As shown in FIG. 2, the check valve 20 comprises a seat ring 21 and a check ring 22 mounted end to end, or in tandem relation, on a tip end portion 23 of the screw 12, with the check ring 22 located forward of the seat ring 21. The seat ring 21 is movable in unison with the screw 12, while the check ring 22 is rotatable relative to the screw 12 and the seat ring 21 within a predetermined angular range. The tip end portion 23 of the screw 12 is initially formed separately from a body of the screw 12. For mounting the check valve 20, the tip end portion 23 is then threaded into an end of the screw body so as to grip or hold the seat ring 21 and check ring 22 between the tip end portion 23 and the body of the screw 12.

Figure 3A:
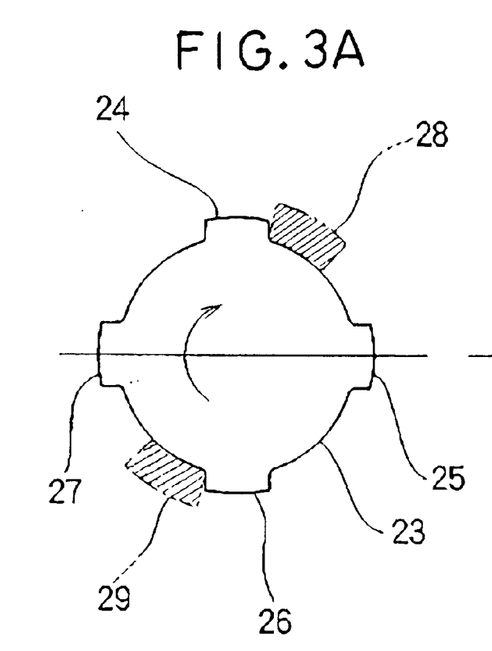
FIG. 3A is a view in the arrow 3*a* of FIG. 2.

As shown in FIG. 3A, the tip end portion 23 of the screw 12 has a plurality (four in the illustrated embodiment) of evenly spaced driving teeth 24, 25, 26 and 27 formed on a circumferential surface thereof.

Figure 3B:
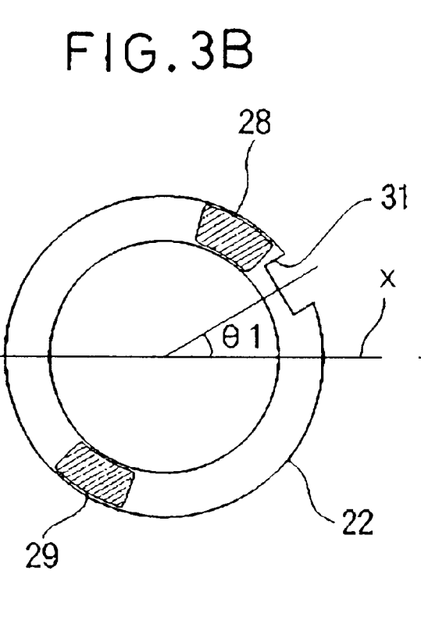
FIG. 3B is a view in the arrow 3*b* of FIG. 1.

Similarly, as shown in FIG. 3B, the check ring 22 has a plurality (two in the illustrated embodiment) of evenly spaced driven teeth 28 and 29 formed on one end face of the seat ring 21 for driven mesh with the driving teeth 24–27. The check ring 22 also has a plurality of axial grooves 31 (only one being shown) formed in an outer circumferential surface thereof for the passage therethrough of a melt of molding material. The axial grooves 31 and the driven teeth 28 are out of phase in the circumferential direction of the check ring 22.

Figure 3C:
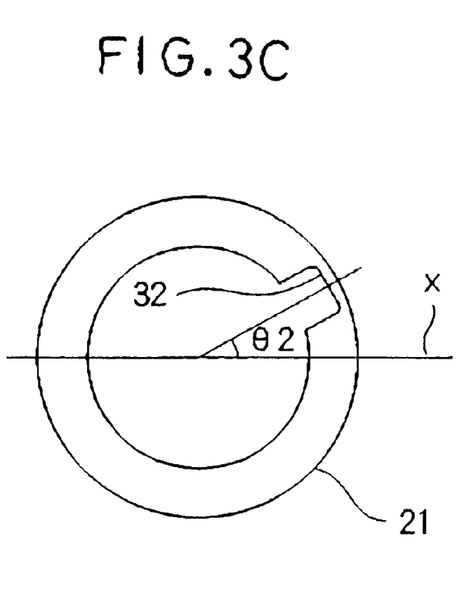
FIG. 3C is a view in the arrow 3*c* of FIG. 1.

As shown in FIG. 3C, the seat ring 21 has a plurality of axial grooves 32 (only one being shown) formed in an inner circumferential surface thereof for the passage therethough of the melt of molding material. The axial grooves 32 each have an upstream end (right end in FIG. 2) opening to an outer circumferential surface of the seat ring 21 for introducing therefrom the melt of molding material into the axial grooves 32. The seat ring 21 and the tip end portion 23 of the screw 12 are coupled together by spline connection so that the seat ring 21 rotates in unison with the screw 12.

As shown in FIG. 3A, rotating the tip end portion 23 in the clockwise direction causes two diametrically opposite driving teeth 24 and 26 to engage the driven teeth 28 and 29, respectively, of the check ring 22 (FIG. 3A). Further clockwise rotation of the tip end portion 23 causes the check ring 22 to rotate clockwise together with the tip end portion 23. The seat ring 21 shown in FIG. 3C always rotates in unison with the tip end portion 23 of the screw 12.

The relative position shown in FIGS. 3A to 3C is achieved from the start to the end of a metering phase or operation of the screw injecting apparatus 10. During the metering operation, the axial grooves 31 (only one shown in FIG. 3B) of the check ring 22 is held at an angle $\theta1$ to the x-axis and the axial grooves 32 (only one shown in FIG. 3C) of the seat ring 21 are held at an angle $\theta2$ to the x-axis. Since $\theta1=\theta2$, the axial grooves 31 of the check ring 22 and the axial grooves 32 of the seat ring 21 are in phase, thus permitting the melt of molding material to pass through the axial grooves 32 and 31 of the check valve 20. Referring back to FIG. 2, during the metering phase, the check valve 20 is in the open position so that while the screw 12 is rotating in a normal direction (counterclockwise direction in FIG. 2), the melt of molding material is fed forward through the axial grooves 32 and 31 of the check valve 20 and gradually accumulated forward of the tip end portion 23 of the screw 12. The tip end portion 23 is spaced backward from a nozzle 11a (FIG. 1) of the heating cylinder 11. During that time, the screw 12 is pushed back rightward in FIG. 2 by a counter force of the melt accumulated around the tip end portion 23 of the screw 12 (between the check valve 20 and the nozzle 11a). The amount of melt can be metered by measuring the retreating or backward stroke of the screw 12.

Figure 4A:
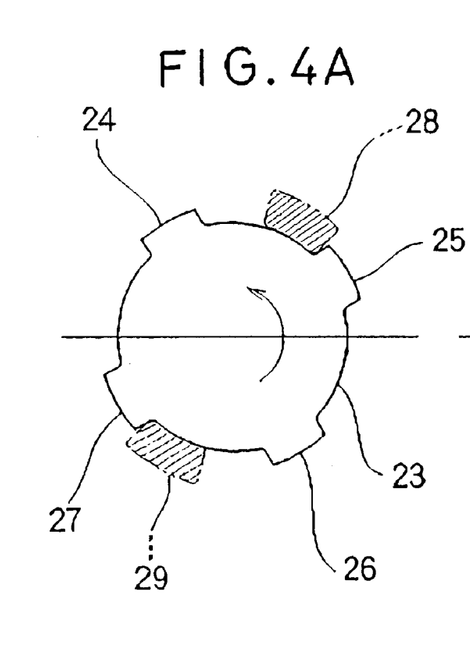
FIGS. 4A, 4B and 4C are views corresponding to FIGS. 3A, 3B and 3C, respectively, showing the check valve in its closed position.
Figure 4B:
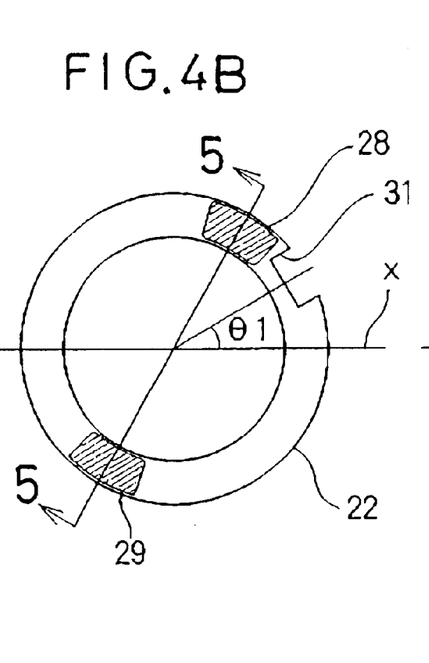
Figure 4C:
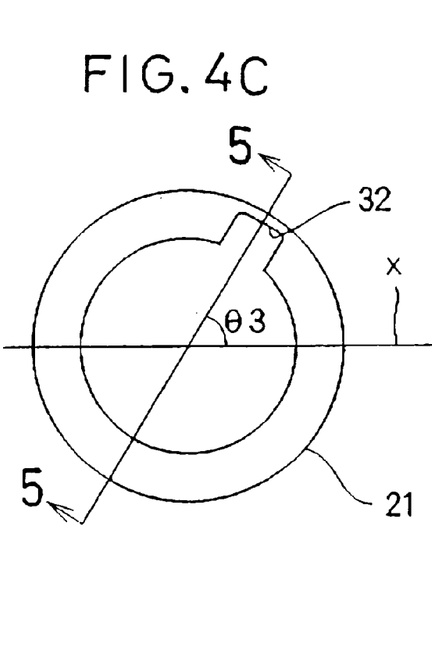
Figure 5:
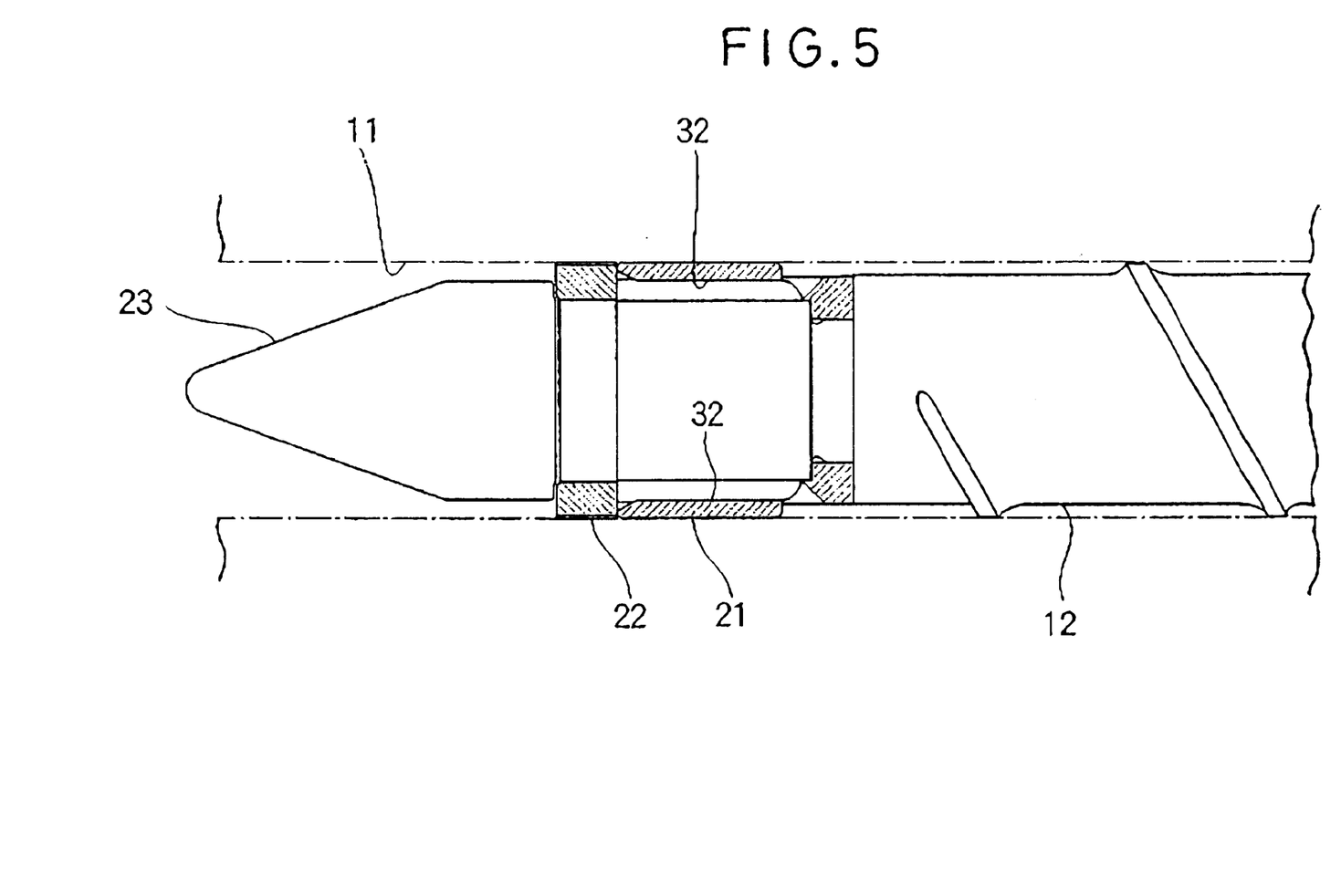
FIG. 5 is a cross-sectional view taken along line 5—5 of FIGS. 4B and 4C.

When the direction of rotation of the screw 12 is reversed, the tip end portion 23 of the screw shown in FIG. 4A rotates in the counterclockwise direction. With this counterclockwise rotation of the tip end portion 23, the driving teeth 24, 26 of the tip end portion 23 separate from the driven teeth 28, 29 of the check ring 22, and the remaining two diametrically opposite driving teeth 25, 27 come into engagement with the driven teeth 28, 29. During that time, the check ring 21 remains stationary with the axial grooves (only one shown in FIG. 4B) being $\theta1$ degrees out of phase with the x-axis, while the seat ring 21 turns counterclockwise together with the tip end portion 23 until the axial grooves 32 (only one shown in FIG. 4C) assume a position which is $\theta3$ degrees out of phase with the x-axis. Since $\theta3>\theta1$, this means that the axial grooves 32 of the seat ring 21 are closed by a body of the check ring 22, as shown in FIGS. 4B and 5. The axial grooves 32 of the seat ring 21 and the axial grooves 31 of the check ring 22 are thus held out of communication with each other, and so the check valve 20 is in the closed position. With the check valve 20 thus closed, the melt of molding material accumulated forward of the tip end portion 23 of the screw 12 is prevented from flowing back toward the screw 12 side.

Figure 6:
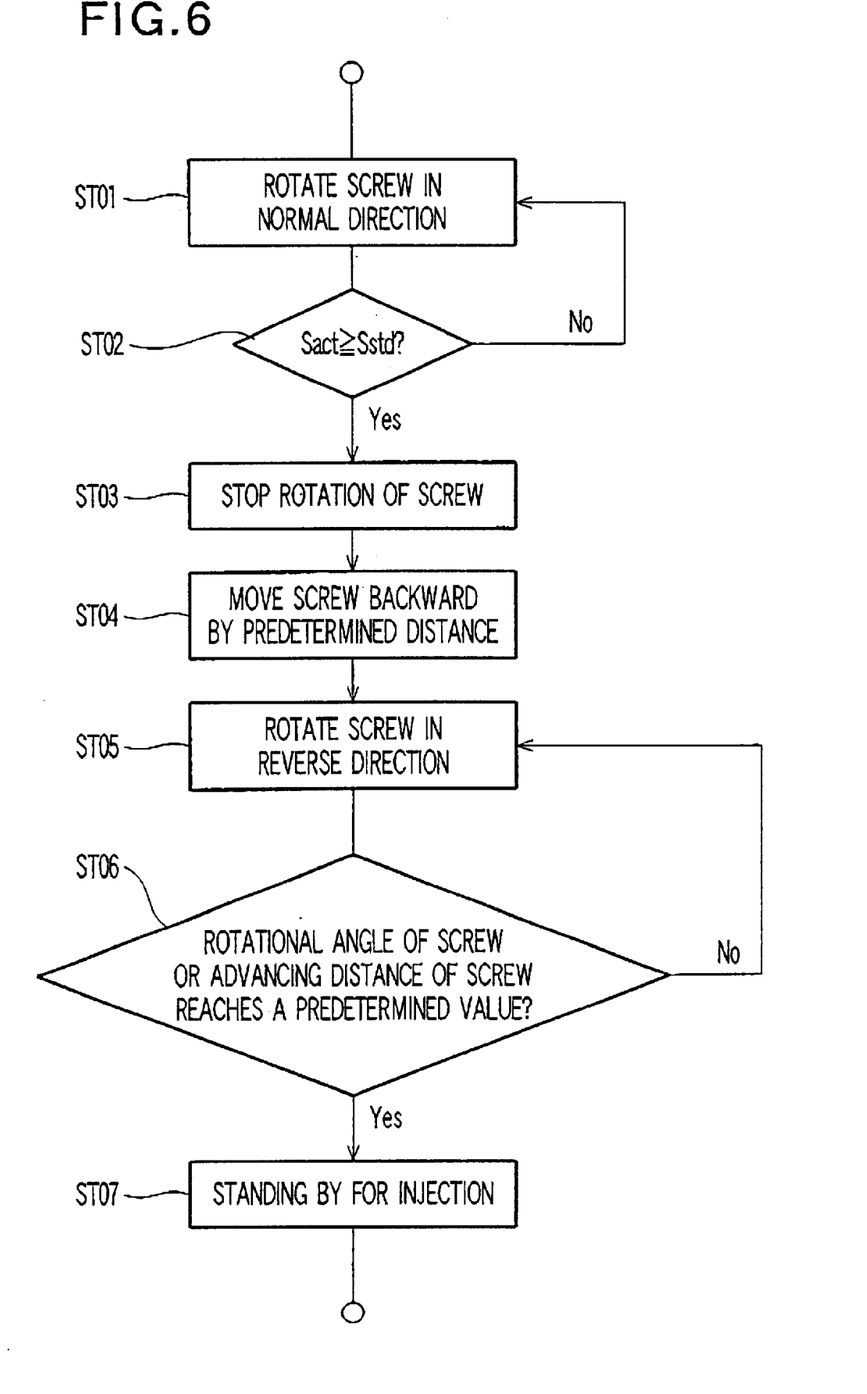
FIG. 6 is a flowchart showing a control routine of the injecting apparatus.

Operation of the screw injecting apparatus 10 achieved under the control of the control unit 19 will be described below with reference to the flowchart shown in FIG. 6.

A step ST01 activates the rotating device 16 (FIG. 1) to rotate the screw 12 in a normal direction (counterclockwise direction in FIG. 2), so that a plasticizing-metering phase or operation is achieved. During that time, the check valve 20 is in the open state as described above with reference to FIGS. 2 and 3A–3C, so that a melt of molding material is fed forward by rotation of the screw 12 through the check valve 20 and accumulated forward of the tip end portion 23 of the screw 12. The screw 12 is pushed back rightward in FIG. 2 by a counter force or pressure of the melt accumulated around the tip end portion 23 of the screw 12 (between the check valve 20 and the nozzle 11a). The amount of melt can be metered by measuring the retreating or backward stroke of the screw 12.

Then, a step ST02 makes a judgment, based on an output electric signal from the linear displacement sensor 18, to determine whether an actual backward stroke Sact of the screw 12 (or the backward position of the screw 12) exceeds a value representing a predetermined amount of distance (or a predetermined position) Sstd preset in the control unit 19. If the result of judgment by the step ST02 is "Yes" (Sact$\leq$Sstd), then the control goes on to a step ST03. Alternatively, it the result of judgment is "No" (Sact<Sstd), the control returns to the step ST01.

The step ST03 deactivates the rotating device 16 to stop rotation of the screw 12. Thus, the plasticizing-metering phase or operation is completed.

Thereafter, a step ST04 activates the injecting cylinder 14 to move the screw 12 backward by a predetermined distance. In this instance, an output electric signal from the linear displacement sensor 18 is used to achieve feed-back control of the injecting cylinder 14. In practice, the predetermined distance is equal to several millimeters. With this backward movement of the screw 12, the reaction force or pressure of melt accumulated around the tip end portion 23 of the screw 12 is reduced.

Then, a step ST05 reverses the direction of rotation of the screw 12 by activating the rotating device 16 in the reverse direction. The screw 12 is thus rotated in the clockwise direction shown in FIG. 2, so that the check valve 20 is brought to the closed position, as described above with reference to FIGS. 4A–4C and 5.

Reverse rotation of the screw 12 causes the screw itself to move forward and thus increases the pressure in a melt accumulating chamber defined between the nozzle 11a and the check valve 20. This may cause a leakage of the malt from the nozzle 11a. Accordingly, the amount of reverse rotation of the screw 12 should be limited to avoid such undue pressure rise resulting the leakage of melt from the nozzle 11a. In the illustrated embodiment, the amount of reverse rotation of the screw 12 is set to be about 30° ($\theta3-\theta2$ shown in FIGS. 4C and 3C). Taking a safety factor to secure reliable closing of the check valve 20, the amount of reverse rotation of the screw 12 is preferably set to be about 90°. Though varying with the type and density of resins used, there is a close relationship established between the amount of reverse rotation of the screw 12 and the amount of forward movement of the screw 12. This means that the amount of reverse rotation of the screw 12 can be used to determine the amount of forward movement of the screw 12. The amount of forward movement of the screw 12 is set to be equal to the predetermined distance of backward movement of the screw set in the step ST04.

Thus, a subsequent step ST06 makes a judgment, based on an output electric signal from the rotary sensor 17 and/or an output electric signal from the linear displacement sensor 18, to determine whether the amount of forward movement of the screw 12 is in equal to the predetermined distance of backward movement of the screw 12 achieved previously in the step ST04. If the result of judgment by the step ST06 is "Yes", the control goes on to a step ST07. Alternatively, if the result of judgment by the step ST06 is "No", the control returns to the step ST05.

The step ST07 provides a ready-to-injection state in which the check valve 20 is in the closed position, and the screw 12 returns to the position achieved by the step ST03.

As described above, according to the present invention, before the check valve is closed in preparation for the injecting process, the screw is moved backward by a predetermined distance to reduce the pressure in a melt accumulating chamber defined between the nozzle and the check valve. With this backward movement of the screw, the leakage of melt from the nozzle does not take place even though the screw moves forward when the screw is rotated in the reverse direction to close the check valve. After the check valve is fully closed, the injecting process is carried out, so that the reverse flow of the melt does not take place. This enables a high-speed injecting operation with high metering accuracy.

Obviously, various minor changes and modifications of the present invention are possible in the light of the above teaching. It is therefore to be understood that within the scope of the appended claims, the present invention may be practiced otherwise than as specifically described.

What is claimed is:

1. A screw injecting apparatus comprising:

a heating cylinder for heating a molding material being transferred therethrough, the heating cylinder having a nozzle at one end thereof;

a screw received in the heating cylinder rotatably and movably back and forth and having a tip end portion spaced backward from the nozzle, the screw, when rotating in one direction, feeding a melt of molding material toward the nozzle while the screw is pushed back by a reaction of the melt accumulated around the tip end portion of the screw head;

a check valve for preventing the melt from flowing backward toward the screw, the check valve comprising a seat ring mounted on the tip end portion of the screw and movable in unison with the screw, the seat ring having an axial groove for the passage therethrough of the melt, and a check ring mounted on the tip end portion of the screw in tandem relation to the seat ring and rotatable relatively to the screw and the seat ring within a predetermined angular range, the check ring having an axial groove for the passage thererthrough of the melt, the axial groove of the check ring and the axial groove of the seat ring being phased such that rotation of the screw in said one direction causes the axial groove in the check to communicate with the axial groove in the seat ring, thereby permitting passage of the melt through the check valve, and rotation of the screw in the reverse direction causes the axial groove of the seat ring to be closed by a body of the check ring, thereby blocking passage of the melt through the check valve; and a control unit for controlling operation of the screw such that in a metering phase of molding process, the screw rotates in said one direction to feed a melt of molding material toward the nozzle, when a metered amount of melt is accumulated forward of the tip end portion of the screw, the screw moves backward by a predetermined distance to reduce the reaction from the metered melt and, thereafter, the screw rotates in the reverse direction to cause the screw to move forward until the amount of forward movement of the screw becomes substantially equal to said predetermined distance.

2. A screw injecting apparatus according to claim 1, wherein the tip end portion of the screw has a plurality of evenly spaced driving teeth formed on an outer circumferential surface thereof, the check ring has a plurality of evenly spaced driven teeth formed on an end face thereof for meshing engagement with the driving teeth of the tip end portion of the screw, the axial groove of the check ring being formed in an outer circumferential surface of the check ring, and the axial groove in the seat ring is formed in an inner circumferential surface of the seat ring.

3. A screw injecting apparatus according to claim 1, wherein the check ring is disposed forward of the seat ring.

4. A screw injecting apparatus according to claim 1, wherein the control unit determines the amount of forward movement of the screw caused by reverse rotation of the screw on the basis of a correlation established between the amount of reverse rotation of the screw and the amount of forward movement of the screw.

* * * * *